Patented Feb. 5, 1952

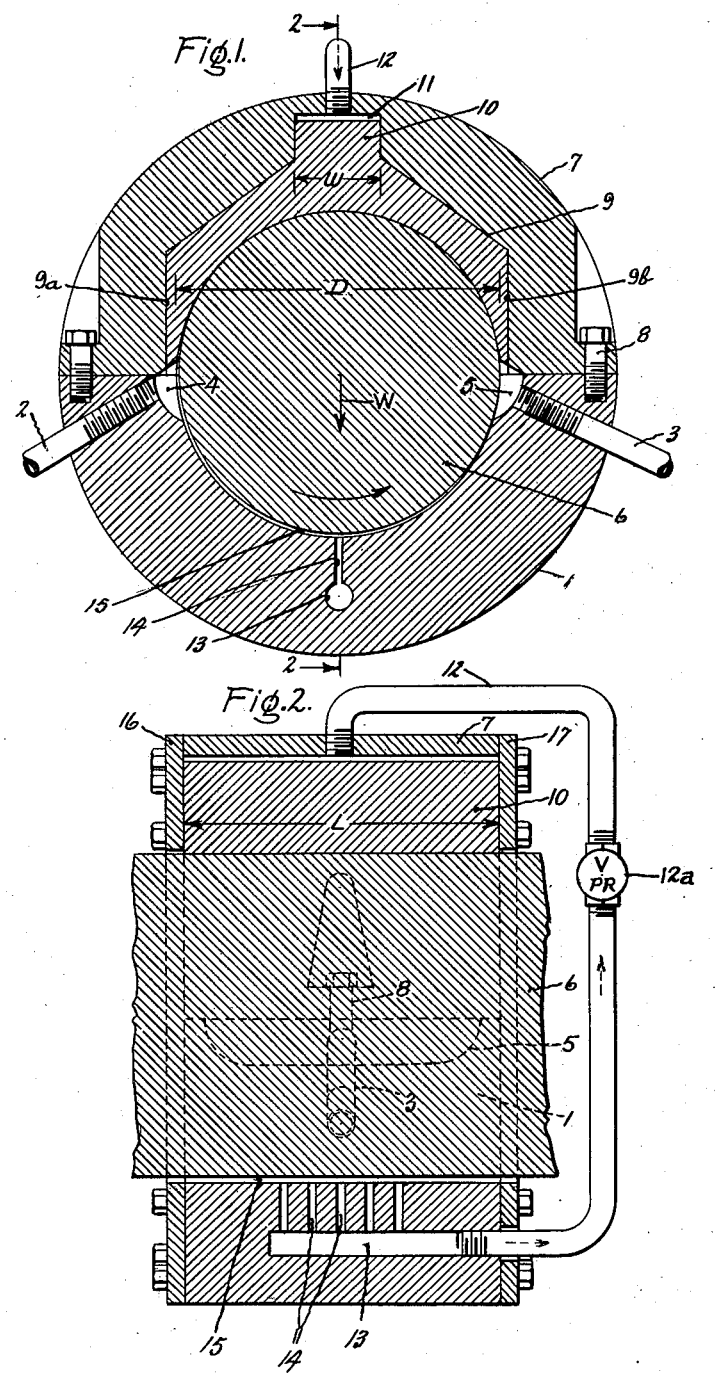

2,584,770

UNITED STATES PATENT OFFICE 2,584,770

JOURNAL BEARING WITH SELF-ENERGIZED HYDRAULICALLY LOADED SEGMENT

Donald F. Wilcock, Marblehead, Mass., assignor to General Electric Company, a corporation of New York Application November 10, 1950, Serial No. 194,956

6 Claims. (Cl. 308—9)

1

This invention relates to journal bearings, particularly for large high speed machinery, for instance journal bearings of the type used in prime movers such as steam turbines and the like.

In bearings of the type described, particularly where a high speed bearing is operated with light loading, trouble has been encountered with a phenomenon known as "whipping." This is a vibration phenomenon apparently related to hydraulic phenomena in the oil film occurring in the rather substantial clearance space between shaft and bearing. It is particularly prevalent in machines like turbines where some unbalance in the rotor, or in the forces applied thereto, produces a rotating load component on the shaft. In connection with large machines such as centrifuges, turbine type prime movers, and other apparatus in which whipping phenomena have been encountered, numerous attempts have been made in the past to overcome this difficulty, as for instance by providing a movable bearing shoe or segment arranged to be biased by various means toward the shaft so as to have a vibration damping effect, or by providing specially arranged oil grooves for applying hydraulic pressure directly to the shaft to counteract the whipping tendency.

The expedients of the prior art devices have not been entirely successful; and the purpose of the present invention is to provide a further improved "anti-whipping" journal bearing arrangement in which a hydraulic biasing force is automatically applied to a movable bearing segment of such a magnitude as to just counteract the whipping tendency without unduly increasing the friction losses and the accompanying heating effect on the bearing.

Other objects and advantages will become apparent from the following description taken in connection with the accompanying drawing, in which Fig. 1 is a transverse sectional view of a journal bearing incorporating the invention, and Fig. 2 is a longitudinal section of the same bearing, taken on the plane 2—2 in Fig. 1.

Generally, the object of the present invention is achieved by providing a movable shoe arranged to be hydraulically biased into engagement with the low pressure side of the journal and employing the hydraulic pressure developed in the high pressure side of the bearing to automatically provide the motive fluid at proper pressure for effecting this biasing function.

Referring now more particularly to Fig. 1, the journal bearing comprises a cylindrical shell formed in two halves, divided along a horizontal plane through the center of the shaft. The lower shell half 1 is provided with conventional means for admitting lubricating oil at a pressure on the order of 10 lb./in.² from a suitable source, including supply holes 2, 3 discharging into axially extending recesses 4, 5 which serve to distribute the lubricant axially along the surface of the journal 6. As will be appreciated by those skilled in the art, only the supply ports 2, 4 may be needed if the bearing is intended for one direction of rotation only, namely, that indicated by the arrow in Fig. 1. In the present instance, the supply passages 3, 5 help to insure that adequate lubricant will be supplied to the movable shoe described hereinafter, and permit operation of the bearing for either direction of shaft rotation.

The upper shell member 7 is secured to the lower shell by a plurality of suitable threaded fastenings 8 in a manner which will be obvious from the drawing. This upper shell member does not contact the journal 6 directly but is provided with a recess extending axially entirely therethrough and forming a chamber for receiving the movable shoe 9. As will be apparent from Fig. 1, the segment 9 has parallel side walls 9a, 9b slidably engaging the flat side walls of the recess in the upper shell half 7. The top portion of segment 9 forms a piston 10 which is rectangular in plan shape, its width being as shown in Fig. 1 as w and its length equal to the full axial length L of the upper shell section 7. The top surface of the rectangular piston 10 defines a clearance space 11 with the cooperating wall of the shell 7, this clearance space constituting the admission chamber for receiving hydraulic motive fluid for biasing the shoe 9 downwardly against the journal 6. This hydraulic fluid is admitted through a suitable inlet conduit 12.

Secured to each end of the shell members 1, 7 are a pair of annular end plates 16, 17 which serve to define the end walls of the recess containing the segment 9 as well as the end wall of the rectangular "cylinder" in which the piston 10 slides.

The essence of the present invention lies in the fact that the pressure fluid for biasing the movable shoe 9 is obtained from the high pressure side of the bearing itself. To this end, the lower shell member 1 is provided with an axial drilled hole 13 serving as a manifold communicating with a plurality of axially spaced radial drilled holes 14 adapted to bleed off oil under pressure from the clearance space indicated at 15 between journal and bearing. It will of course be appreciated that this clearance space is considerably exaggerated in the drawing, in the interests of clarity.

As will be understood by those familiar with the theory of journal bearing lubrication, rotation of the journal 6 in the direction indicated in Fig. 1 causes oil from the supply recess 4 to be dragged downwardly into the clearance space 15 so as to build up a hydraulic pressure against the bottom surface of the shaft, which pressure serves to support the weight of shaft and connected parts. For purposes of the analysis presented hereinafter, this weight of the rotor will be indicated by the symbol W, which, of course, acts downwardly as indicated by the arrow labeled W in Fig. 1. Thus, it will be understood that the bleed ports 14 are located in that portion of the bearing where the oil film pressure is highest. This comparatively high pressure applied to the piston 10 produces a downward biasing force on the low pressure side of the journal which tends to force the center of the shaft 6 below the geometrical center of the journal bearing surfaces. This action is found to reduce or completely overcome the tendency of the shaft to "whip," when the biasing piston and the means for supplying the hydraulic motive fluid to it are properly designed.

I have discovered that the following factors must be given careful consideration in designing an effective bearing of this type.

The effective area of the biasing piston 10 is quite critical. The method of properly proportioning it will be seen from the following discussion, in which the following notation will be used:

W—Weight of rotor
L—Axial length of the journal bearing surfaces
D—Diameter of the journal
$p_0$—The "average bearing pressure," produced by the weight of the rotor W
w—Width of biasing piston
r—The ratio of the effective area ($w \times L$) of the biasing piston to the total bearing "projected area" ($L \times D$)
P—Oil film pressure generated in clearance space between journal and bearing surface at bottom of bearing
p—The actual average bearing pressure on the lower half of the bearing, due to the combined effect of the weight W of the rotor 6 and the biasing force of the piston 10
n—The ratio of the oil pressure P to the average bearing pressure loading p It will be understood that the average bearing pressure $p_0$ due to the shaft loading W alone will be given by the expression ($W/LD$). Also, the pressure P of the oil withdrawn through the ports 14 and applied to the piston 10 will be given by the expression ($n \times p$).

I have discovered that for successful operation a prime criterion which must be met is that the term ($r \times n$) be less than unity, since $npr + p_0 = p$, and $$p = \frac{p_0}{1 - nr}$$

If this term becomes equal to or greater than 1, the total bearing load increases to infinity and the bearing fails. Therefore, the most elementary embodiment of the invention is one in which the term ($r \times n$) is less than 1. Experience with conventional journal type bearings shows that the factor $n$ is usually about 3. If, by way of example, the area of biasing piston 10 be such that the area ratio $r$ is .25, then the actual bearing pressure $p$ will be four times the normal bearing pressure, which would be obtained without using the invention, due to the weight W of the rotor alone. This has been verified with a sample bearing having a length L of about 6", a shaft diameter D of 6", and a biasing piston 10 having a length equal to the full length of the bearing L and a width $w$ of 1½", the total clearance between journal and bearing surfaces being on the order of .011", measured on the diameter with the movable segment 9 in fully retracted condition.

It is considered that the degree to which the actual bearing pressure or "loading" $p$ is increased by use of the invention, represented by the "load factor" $p/p_0$, cannot safely be carried to values greater than 5 with the invention in its simplest form, as described above. If a greater load factor is desired, the area of the piston 10 may be increased until the product ($r \times n$) is greater than unity, provided a relief valve or equivalent device is inserted in the oil supply line 12, as indicated diagrammatically at 12a in Fig. 2. This flow limiting device is designed, or made adjustable, so that the hydraulic force applied to the movable segment 9 will not be so great as to cause failure of the bearing.

It may be noted that the ordinary leakage occurring from the hydraulic chamber 11, through the clearances between the segment 9 and the shell 7 is somewhat equivalent in effect to providing an orifice, relief valve, or other flow restricting device in the supply line 12.

With respect to the manner in which the hydraulic motive fluid is derived, it is to be noted that the bleed ports 14 are located only in an area constituting the middle third of the length of the bearing surface. Also, it will be seen that the ports 14 are located vertically below the shaft 6, diametrically opposite the movable shoe 9. This is the most desirable arrangement when the shaft is intended for either direction of rotation. If the shaft is intended to rotate in one direction only, the ports 14 may be located in the area of greatest oil film pressure, as determined by simple experiment. Ordinarily this location will be slightly spaced from the vertical location shown in Fig. 1.

The invention provides means for automatically applying an additional biasing force to a lightly loaded journal so as to remove it from the range of operation in which whipping phenomena are encountered; while, if the design criteria outlined above are given due consideration, the added friction and heating effects in the bearing will not be unduly deleterious.

It will be apparent to those skilled in the art that many substitutions of mechanical equivalents may be made. For instance, instead of the single rectangular piston 10, one or more round pistons disposed in round cylinders may be employed. Also, a flexible diaphragm type of hydraulic motor might be used in place of the piston-cylinder arrangement disclosed herein.

Still other modifications will occur to those skilled in the art, and it is desired to cover by the appended claims all such changes as fall within the true spirit and scope of the invention.

What I claim as new and desire to secure by Letters Patent of the United States is:

1. In an anti-whipping arrangement for an oil-lubricated journal bearing of the type having a movable bearing segment slidably disposed for movement against the low pressure side of the journal, the combination of hydraulic motor means for biasing the movable segment to apply a force to the low pressure side of the journal and thereby displace the journal slightly towards the high pressure side of the bearing, the bearing having at least one bleed port for withdrawing oil under pressure from the clearance space defined between the journal and bearing surfaces at the high pressure side of the bearing, and conduit means for supplying fluid under pressure from said bleed port to said hydraulic motor, whereby the loading on the journal is artificially increased by hydraulic pressure generated within the bearing itself.

2. An anti-whipping journal bearing arrangement in accordance with claim 1 in which the hydraulic motive fluid is withdrawn from the clearance space between journal and bearing surface at a location substantially diametrically opposite the movable segment and along substantially the middle third of the axial length of the bearing surface.

3. An anti-whipping journal bearing arrangement in accordance with claim 1 in which the effective area of the hydraulic motor is so related to the projected area of the journal that the product $(r \times n)$ is less than unity.

4. An anti-whipping journal bearing arrangement in accordance with claim 1 in which the load factor $p/p_0$ is greater than 5, and fluid pressure reducing means is incorporated in the conduit supplying motive fluid to the hydraulic motor.

5. In an anti-whipping arrangement for an oil-lubricated journal bearing of the type having a movable bearing segment slidably disposed for movement against the low pressure side of the journal, the combination of hydraulic motor means for biasing the movable segment towards the journal and comprising a piston member connected to the segment, walls surrounding said piston to define a pressure chamber, bleed passage means for withdrawing oil under pressure from the clearance space defined between the journal and bearing surfaces at the high pressure side thereof, and conduit means for supplying fluid under pressure from the bleed passage to the pressure chamber, whereby the loading on the journal is increased by hydraulic pressure generated by rotation of the journal in the bearing.

6. In a stabilized liquid-lubricated journal bearing having a movable bearing member adapted to be biased against the low pressure side of the journal, the combination of hydraulic motor means for applying a biasing force to said movable member, walls defining bleed port means for withdrawing liquid under pressure from the clearance space defined between journal and bearing surfaces at a high pressure region thereof, and conduit means for supplying fluid under pressure from said bleed port to the hydraulic motor means, whereby the loading on the journal is increased by pressure generated by rotation of the journal relative to the bearing.

DONALD F. WILCOCK.

REFERENCES CITED

The following references are of record in the file of this patent:

UNITED STATES PATENTS

| Number | Name | Date |
|---|---|---|
| 1,940,301 | Grobel | Dec. 19, 1933 |
| 1,947,023 | Shoemaker | Feb. 13, 1934 |
| 2,225,761 | Asbridge | Dec. 24, 1940 |
| 2,502,173 | Potts | Mar. 28, 1950 |